US007023488B2

(12) United States Patent
Szybiak et al.

(10) Patent No.: US 7,023,488 B2
(45) Date of Patent: Apr. 4, 2006

(54) CIRCUIT AND METHOD FOR LIVE SWITCHING OF DIGITAL VIDEO PROGRAMS CONTAINING EMBEDDED AUDIO DATA

(75) Inventors: Semko Szybiak, Toronto (CA); Alan Plaunt, Courtice (CA); Romolo Magarelli, Woodbridge (CA)

(73) Assignee: Evertz Microsystems Ltd., Burlington (CA)

( * ) Notice: Subject to any disclaimer, the term of this patent is extended or adjusted under 35 U.S.C. 154(b) by 449 days.

(21) Appl. No.: 10/108,445

(22) Filed: Mar. 29, 2002

(65) Prior Publication Data
US 2002/0167608 A1 Nov. 14, 2002

Related U.S. Application Data

(60) Provisional application No. 60/285,321, filed on Apr. 20, 2001.

(51) Int. Cl.
*H04N 7/08* (2006.01)

(52) U.S. Cl. ........................................ 348/484; 386/54

(58) Field of Classification Search ................ 348/512, 348/515, 500, 484, 480–482, 423.1; 710/61; 386/4, 39, 98–99, 53–54
See application file for complete search history.

(56) References Cited

U.S. PATENT DOCUMENTS

| 5,343,251 | A | * | 8/1994 | Nafeh .......................... 348/571 |
| 5,553,220 | A | * | 9/1996 | Keene .......................... 345/520 |
| 5,875,354 | A | * | 2/1999 | Charlton et al. .............. 710/61 |
| 5,907,295 | A | * | 5/1999 | Lin .............................. 341/61 |
| 5,929,921 | A | * | 7/1999 | Taniguchi et al. ........... 348/484 |
| 6,243,032 | B1 | * | 6/2001 | Uramoto et al. ............. 341/110 |
| 6,359,656 | B1 | * | 3/2002 | Huckins ....................... 348/512 |
| 6,429,902 | B1 | * | 8/2002 | Har-Chen et al. ........... 348/518 |
| 6,606,127 | B1 | * | 8/2003 | Fang et al. .................. 348/500 |
| 6,721,361 | B1 | * | 4/2004 | Covell et al. ............ 375/240.14 |

* cited by examiner

*Primary Examiner*—Paulos M. Natnael
(74) *Attorney, Agent, or Firm*—Bereskin & Parr

(57) ABSTRACT

A circuit for detecting a transition in the content of a digital video stream containing embedded audio samples and providing a smooth transition from an old audio stream embedded before the transition to a new audio stream embedded after the transition. The circuit detects the transistion and in response it fades out the old audio stream and fades in the new audio stream. During the transition, the old and new audio signal are buffered. The old stream is not faded out until only a number of audio samples required for the fading process remain in the associated buffer. The new audio stream is not faded in until a selected number of audio samples have been stored I the associated buffer. The selected number of samples is typically smaller than the number of samples that is desirably stored in the associated buffer during steady state operation. An interpolation operation is used to allow the number of new audio samples in the associated buffer to build up to the desired number.

48 Claims, 7 Drawing Sheets

CIRCUIT AND METHOD FOR LIVE SWITCHING OF DIGITAL VIDEO PROGRAMS CONTAINING EMBEDDED AUDIO DATA

FIELD OF THE INVENTION

This invention relates to audio signals. More particularly, the invention relates to a system and method for providing a smooth audio transition when an input stream of video data with embedded audio data is switched from one program signal to another.

BACKGROUND OF THE INVENTION

In both consumer and professional audio processing devices, the use of digital audio signals is increasing rapidly. Increasingly, these audio signals are combined with video signals and may in fact be embedded within a video signal. For example, the ANSI/SMPTE272M-1994 standard sets out a system for embedding audio information in the ancillary data space of a digital video signal. This standard permits up to four audio data packets, which may contain audio data for one or more audio samples, to be transmitted in the ancillary data space for most television lines in each frame of a digital video signal. Some television lines may be limited to carrying less than four samples and some lines may not be used for audio data packets at all.

A typical digital audio/video receiver (e.g. a digital television set) must be capable of receiving an input stream of digital video data with embedded audio and must be able to handle a change in the content of its input stream. Such a change may occur when an upstream device such as a router switches the input stream from one program signal to a second program signal. The two program signals will normally not be synchronized and the switch may result in a period of instability in the input stream. The resulting lack of stability does not substantially affect the processing of the video component of the signal, but it can have a significant effect on the processing of the audio component. Differences in audio level and balancing can result in an audible audio "pop" if the transition is made without any protective circuitry. In some cases, this pop can damage speakers and other circuits, depending on its frequency components and their intensity.

One known solution to this problem is to detect the transition in the input stream and then mute the audio output from the device for a fixed muting period. This approach has several disadvantages. First, the muting period must (or at least should) be selected to be longer than the longest expected period of instability on the input stream. Since this will typically be considerably longer than the average period of instability, the audio component of an audio/video presentation from the receiver will be interrupted for a longer period than is required. Second, many valid audio samples will be discarded during most transitions since the period of instability will be over well before the muting period. Finally, in a case where the period of instability is longer than expected, the muting period may end while the input stream is still unstable. This may result in an audio pop being undesirably transmitted to other devices. In general, this solution is a "brute force" approach to the problem and is relatively inelegant.

Accordingly, there is a need for a circuit for efficiently receiving an input stream of digital video data in which audio data has been embedded and which may have an upstream source transition. The circuit will preferably make use of all valid audio samples available in the input stream and will interrupt the presentation of the audio data for a relatively short period. Preferably, the interruption is made without sudden audio level changes.

SUMMARY OF THE INVENTION

The present invention provides a circuit that overcomes the disadvantages of the prior art. The circuit incorporates a disruption detector that detects transitions in the content of a input stream of digital video in which audio information has been embedded. When no transition is detected, audio samples are de-embedded from the input stream and stored in a main FIFO buffer. They are then read from the main FIFO buffer synchronously and transmitted to an audio processing circuit as an audio output stream.

When a transition to a second program signal is detected in the input stream, the storage of audio samples is suspended until valid audio samples can be de-embedded. These audio samples are then stored in a second FIFO buffer. When the number of samples in the main FIFO buffer falls to a fade-out threshold, the remaining audio samples from the main FIFO buffer are faded out from the audio output stream.

When the number of audio samples in the second FIFO buffer reaches a fade-in threshold, these audio samples are faded into the audio output stream. Preferably, this fade-in process is not commenced until the fade-out of audio samples from the main FIFO buffer has started.

As a result of these operations, all valid audio samples are utilized and transmitted in the audio output stream and the period of attenuated or zero audio output is reduced. In addition, the smooth fading in and out for the audio signal between program signals provides a more elegant and less disruptive audio reproduction.

Preferably, the main FIFO buffer and the second FIFO buffer are operated in a steady state with about 50% of their memory space used for audio samples, on average. Although this 50% level is preferred, any selected level may be used. In order to allow the audio samples stored in the second audio buffer to be used before the second FIFO buffer is filled to the selected level, an interpolation operation is used initially when fading in the second audio program and for a period thereafter. During the interpolation operation, a selected number of real audio samples are read from the second FIFO buffer, then one sample is interpolated using any known interpolation algorithm and is transmitted as part of the audio output stream. This allows one additional audio sample to be stored in the second FIFO buffer. This process of transmitting a number of real audio samples followed by one (or more) interpolated samples is followed until the second FIFO buffer contains the desired number of audio samples. At that point the interpolation operation is terminated.

After the interpolation operation is completed, the contents of the second FIFO buffer are copied into the main FIFO buffer and subsequently, additional samples are stored in the main FIFO buffer. Audio samples are also subsequently read from the main audio buffer and then transmitted as part of the audio output signal. This returns the circuit to its original condition and makes the second FIFO buffer and the interpolator circuitry ready for the next transition.

The present invention may be used to switch between any two streams of digital audio samples embedded within the input stream. The streams of digital audio samples need not be embedded within a digital video stream. Either of both of the streams of digital audio samples only.

In one embodiment, the present invention provides a method of providing an audio output stream in response to a digital video input stream containing embedded audio samples, the method comprising: receiving a first program in the input stream wherein the first program includes a series of first program audio samples; storing the first program audio samples in a main audio data buffer; reading the first program audio samples from the main audio data buffer and transmitting them as part of the audio output stream; detecting a transition in the input stream wherein said transition indicates the beginning of a second program, and wherein the second program includes a series of second program audio samples; receiving the second program audio samples; storing the second program audio samples in a second audio data buffer; when the number of first program audio samples in the main audio data buffer reaches a fade-out threshold, transmitting each of the remaining first audio program samples in the audio output stream at progressively lower audio levels; and when the number of second program audio samples in the second audio data buffer reaches a fade-in threshold, reading a set of fade-in samples from the second audio buffer and transmitting the fade-in samples as part of the audio output stream at progressively higher audio levels.

In another embodiment, the present invention provides a method of providing an audio output stream in response to an input stream containing a stream of first program audio samples followed by a stream of second program audio samples, the method comprising: receiving the stream of first program audio samples and sequentially storing the first program audio samples in a main audio data buffer; reading the first program audio samples from the main audio data buffer and transmitting them as part of the audio output stream; detecting a transition in the input stream from the stream of first program input samples to the stream of second program audio samples; receiving the stream of second program audio samples and sequentially storing the second program audio samples in a second audio data buffer; when the number of first program audio samples in the main audio data buffer reaches a fade-out threshold, transmitting each of the remaining first audio program samples in the audio output stream at progressively lower audio levels; and when the number of second program audio samples in the second audio data buffer reaches a fade-in threshold, sequentially reading a set of fade-in samples from the second audio buffer and transmitting the fade-in samples as part of the audio output stream at progressively higher audio levels.

In another embodiment, the present invention provides a system for transmitting an audio output stream in response to an input stream containing a stream of first program audio samples followed by a stream of second program audio samples, the system comprising: an input terminal for receiving said input stream; a disruption detector coupled to said input terminal for detecting a transition in said input stream between said stream of first program audio samples and said stream of second program audio samples and for generating a disruption signal corresponding to said transition; a transition controller coupled to said disruption detector for generating a main buffer write enable signal and a second buffer write enable signal in response to said disruption signal; an audio de-embedder coupled to said input terminal for extracting said first and second program audio samples from input stream and for generating a valid audio sample signal for indicating when valid audio samples are being received; a main buffer coupled to said audio de-embedder for receiving and storing said stream of first program audio samples in response to said first buffer write enable signal while valid audio samples are being received; a second buffer coupled to said audio de-embedder for receiving and storing said stream of second program audio samples in response to said second buffer write enable signal while valid audio samples are being received; a main output controller coupled to said main buffer for reading said first program audio samples from said main buffer and for transmitting a main audio stream corresponding to said first program audio samples, wherein, when the number of said first program audio samples stored in said main buffer is at or below a selected fade-out threshold, said main output controller attenuates the audio level of each remaining first program audio sample in said main audio stream; a second output controller coupled to said second buffer for reading said second program audio samples from said second buffer and for transmitting a second audio stream corresponding to said second program audio samples, wherein, said second output controller is configured to attenuate the audio level of a selected number of fade-in second program audio samples in said second output stream, wherein said second output controller is configured to begin reading said second program audio samples after the number of said first program audio samples stored in said main buffer is at or below the selected fade-out threshold; a summer coupled to main output controller and to said second output controller for generating said audio output stream corresponding to said main output stream and said second output stream, wherein said transition controller configures said main buffer write enable signal and said second buffer write enable signal such that, prior to the detection of said transition, said main buffer is enabled and said second buffer is disabled and, after said transition, said main buffer is disabled and said second buffer is enabled.

In another embodiment, the present invention provides a method of building up the number of audio samples stored in a FIFO buffer, comprising: storing an input stream of audio samples in the FIFO buffer; reading successive audio program samples from the FIFO buffer and transmitting them as part of a synchronous output stream; during step (b), periodically inserting an interpolated sample into the output stream, whereby the periodic insertion of interpolated samples allow the number of samples stored in the FIFO buffer to increase.

Other aspects of the present invention are described below.

BRIEF DESCRIPTION OF THE DRAWINGS

A preferred embodiment of the present invention will now be described in detail with reference to the drawings, in which.

DETAILED DESCRIPTION OF THE PREFERRED EMBODIMENT

Figure 1:
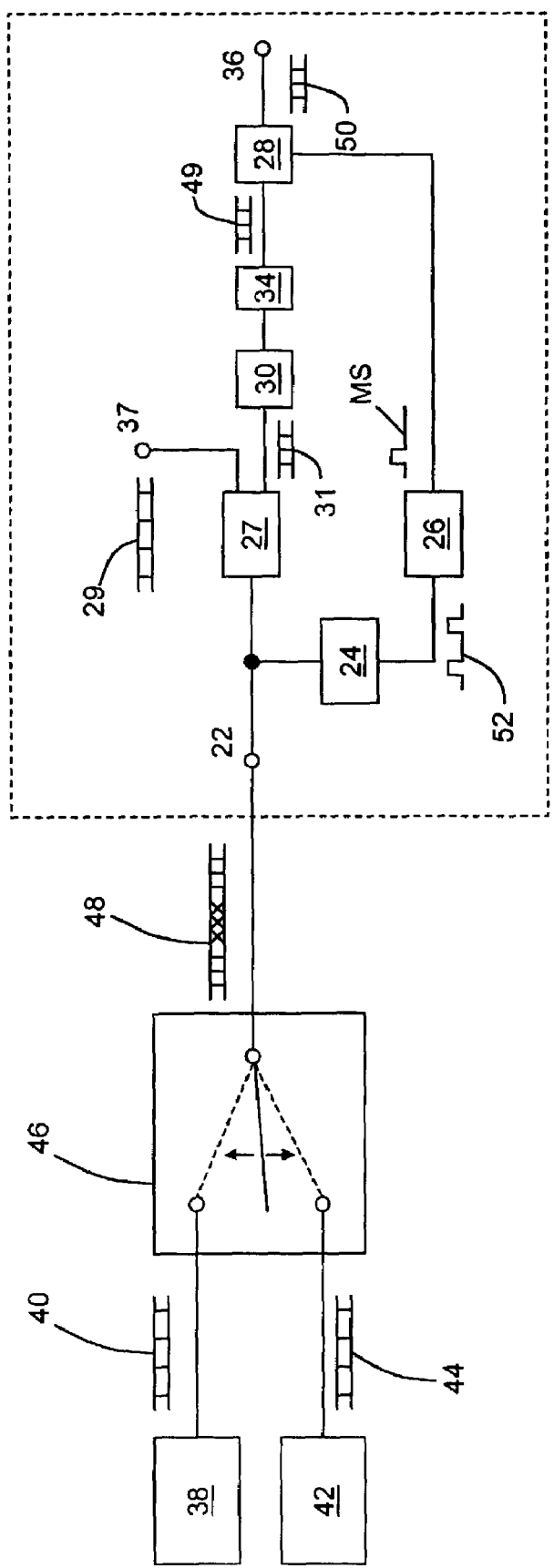
FIG. 1 is a block diagram of a prior art circuit for receiving digital video data with embedded audio data.

Reference is first made to FIG. 1 which illustrates a prior art circuit 20 for providing an output audio stream 50 in response to an input stream 48.

Circuit 20 has an input terminal 22, disruption detector 24, a transition controller 26, a muting circuit 28, an audio FIFO buffer 30, an output controller 34, an audio output terminal 36 and a video output terminal 37.

Circuit 20 receives input stream 48 at its input terminal 22. Typically, input stream 48 comprises a stream of digital video data containing embedded digital audio data. Digital audio data may be embedded in the stream of digital video data in accordance with ANSI/SMPTE Standard 272M-1994 or according to another standard for embedding audio information in a digital video signal. The embedded digital audio data typically consists of a series of audio samples which are intended to be presented to a viewer synchronously with the frames of the digital video signal. For example, the NTSC video standard for broadcast video recommends that 29.97 frames of video are displayed per second synchronously with 48,000 samples of audio information. The audio samples may be assembled into packets which are then embedded into the non-active portion of the digital video signal, including the vertical and horizontal blanking intervals.

Audio samples will typically be embedded in only some of the lines of the digital video signal and will typically not be embedded in a regularly spaced manner. As a result, the audio information in input stream 48 is typically "bursty" in that it may be embedded more densely or sparsely at different points in the digital video signal.

Depending on the standard used for transmitting input stream 48, it may be encoded with several types of synchronization or validity checking data. For example, the video component of input stream 48 may be encoded with a video timing reference signal that may be used by circuit 20 to lock onto the timing of input stream 48. The audio samples (or packets) in input stream 48 may be encoded with audio block numbers that may be used to ensure that all audio samples (or packets) are received and utilized in the correct order. The audio samples (or packets) may also be encoded with a parity bit or bits that may be used to check the validity of the audio samples (or packets). Other synchronization or validity checking data may be provided in addition to or in place of these types of synchronization and validity checking data.

A first signal source 38 provides a first program signal 40. Similarly, a second signal source 42 provides a second program signal 44. First and second program signal 40, 44 have a format suitable for use as input stream 48. First and second signal sources 38, 42 are coupled to a router 46 which can couple one of first program signal 40 or second program signal 44 to input terminal 22 as input stream 48.

Typically, first and second program signals 40, 44 are not synchronized with one another. When router 46 switches from one of the program signals (40 or 44) to the other, the content of input stream 48 changes. This is defined as a "transition" in the content of input stream 48. Since the first and second program signals are not synchronized, a transition in the content of input signal 48 can result in a period of instability in the content of input signal 48. The instability in the content of input signal 48 may include invalid video and audio information and completely lost video and audio information.

Disruption detector 24 is coupled to terminal 22 and receives input stream 48. Disruption detector 24 is configured to determine if a transition in the content of the input stream 48 has occurred by examining the synchronization and validity information encoded into input stream 48. For example, if disruption detector 24 finds a change in the video timing reference signal, the audio block number of the input stream 48 and audio parity errors, it may determine that a transition in the content of input stream 48 has occurred.

Disruption detector 24 may require a change or error in one, two or three of these pieces of data before determining that a transition has occurred. A person skilled in the art will be capable of configuring disruption detector 24 to determine when a transition has occurred in input stream 48 based on the format of input stream 48.

Transition controller 26 is coupled to disruption detector 24 to receive a disruption signal 52. Normally, disruption signal 52 is low. When disruption detector 24 detects a disruption in input stream 48, it makes disruption signal 52 high. When disruption detector 24 determines that input signal 48 is again valid after a disruption, it returns to the normal condition in which disruption signal 52 is low.

De-embedder 27 is also coupled to input terminal 22 to receive input stream 48. De-embedder 27 separates the video and audio components of input stream 48 and provides two data streams: a video stream 29 of video data and an audio stream 31 of audio samples. Video stream 29 is coupled to video output terminal 37 from which it may be received by a video signal processor (not shown).

Audio stream 31 will typically be a bursty stream, due to the bursty manner in which audio samples are typically embedded in digital video data. Audio stream 31 is coupled to audio FIFO buffer 30. Audio FIFO buffer 30 is a typical first-in/first-out buffer which receives audio stream 31 and stores the audio samples sequentially in its internal memory. Subsequently, the audio samples may be read out in the same order in which they were received by making successive read operations. When a particular piece of data is read out from audio FIFO buffer 30, it is discarded by the buffer.

Audio samples stored in audio FIFO buffer 30 are read out by output controller 34 in a synchronous manner in accordance with the timing requirements of the format used to encode input stream 48. Output controller 34 transmits the audio samples in a synchronous stream 49 to muting circuit 28.

In addition to the synchronous stream 49 of audio samples from output controller 34, muting circuit 28 also receives a muting signal MS from transition controller 26. When muting signal MS is low, muting circuit 28 transmits synchronous stream 49 of audio samples as a synchronous audio output stream 50 at audio output terminal 36, from which they may be received by an audio signal processor (not shown).

When muting signal MS is high, muting circuit 28 discards the audio samples in synchronous stream 49 and no audio data is transmitted to audio output terminal 36.

Circuit 20 has two modes of operation. The first is a "steady state" mode which occurs when no disruption has been detected by disruption detector 24. The second mode is a "transition mode", which is initiated when a transition is detected by disruption detector 24.

During the steady state mode of operation, the disruption signal 52 is low. In response, transition controller 26 sets muting signal MS low. De-embedder 27 provides audio stream 31. Muting circuit 28 does not modify audio stream 31. Audio FIFO buffer 30 stores the bursty audio samples in audio stream 31 sequentially. Output transition controller 26 retrieves the audio samples and transmits them synchronously as output audio stream 50. Prior art circuit 20 thus provides output audio stream 50 corresponding to the audio component of input stream 48.

When a transition occurs, disruption detector 24 detects the transition and makes disruption signal 52 high. In response transition controller 26 makes muting signal MS high for a selected muting period. Muting circuit 28 blocks audio stream 31 and no audio data is transmitted to audio FIFO buffer 30. Output controller 34 will continue to read audio samples out of audio FIFO buffer 30 and transmit at output terminal 36 until the audio FIFO buffer 30 is empty. When audio FIFO buffer 30 is empty, output audio stream 50 has a zero value and no audio data is transmitted to the audio signal processor. Effectively, the audio output stream 50 has been muted.

After a transition, it may be some time before input signal 48 is stable and can be received by circuit 20 (i.e. disruption detector 24 and de-embedder 27 are able to receive all data in input stream 48, including being able to synchronize with the new video timing reference signal or other synchronization signal). The muting period is selected to be longer than the length of any expected instability in input stream 48 following a transition, to ensure that when the muting period ends, de-embedder 27 is able to provide an audio stream 31 containing valid audio samples to audio FIFO buffer 30 through muting circuit 28.

Prior art circuit 20 has several disadvantages. Since the muting signal must be kept high for a relatively long period, a large number of valid audio samples may be blocked by muting circuit 28, particularly if the instability of input stream 48 is shorter than average. This will generally result in output audio stream 50 being muted for a longer period than is necessary after most transitions. Furthermore, it is possible that input stream 48 has not become stable after the muting period. If this occurs, an audio "pop" may occur when the muting period ends despite the use of circuit 20. This may occur, for example, if the transition was not caused by router 46 being switched between sources 38 and 42 but by a malfunction or power failure in the signal source 38 or 42 coupled to input terminal 22.

Figure 2:
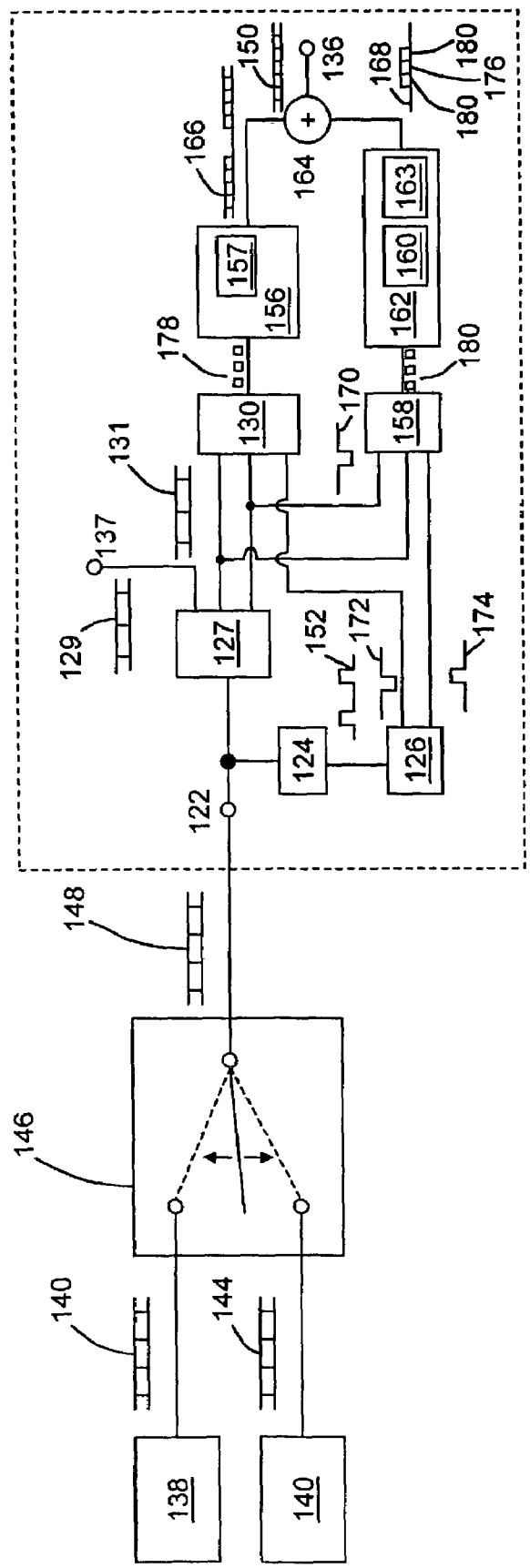
FIG. 2 is a block diagram of a circuit according to the present invention.

Reference is next made to FIG. 2, which illustrates an improved circuit 120 according to the present invention. Elements corresponding to elements in FIG. 1 are identified by like reference numerals, increased by 100.

Circuit 120 has an input terminal 122, a disruption detector 124 and audio de-embedder 127, a transition controller 126, a main FIFO buffer 130, a main output controller 156, a second FIFO buffer 158, a second output controller 162, a summer 164, an audio output terminal 136 and a video output terminal 137.

Signal sources 138 and 142 operate in the same manner as signal sources 38 and 42 to produce corresponding program streams 140 and 144. Router 140 couples one of the program streams 140 or 144 to input terminal 122 as input stream 148. Input stream 148, like input stream 48, is a digital video signal with embedded audio information.

Disruption detector 124 operates in a manner analogous to disruption detector 24 (FIG. 1) to determine when a transition has occurred in the content of digital program input stream 148. When such a transition occurs, disruption detector 124 transmits a disruption signal 152 to transition controller 126.

De-embedder 127 also receives input stream 148 and provides a video stream 129 at video output terminal 137 and an audio stream 131 of audio samples. In addition, de-embedder 127 provides a valid audio sample signal 170 which indicates whether it is transmitting valid audio samples in audio stream 131.

Audio stream 131 and valid audio sample signal 170 are coupled to main FIFO buffer 130 and second FIFO buffer 158. Main FIFO buffer 130 receives a main audio buffer write enable signal 172 from transition controller 126. When both main audio buffer write enable signal 172 and valid audio sample signal 170 are high, audio samples from audio stream 131 are stored in main FIFO buffer 130. Second FIFO buffer 158 receives a second audio buffer write enable signal 174 from transition controller 126. When both second audio buffer write enable signal 174 and valid audio sample signal 170 are high, audio samples from audio stream 131 are stored in second FIFO buffer 158. When valid audio sample signal 170 is low, no valid audio samples exist in audio stream 131 and accordingly, no audio samples are stored into either main FIFO buffer 130 nor second FIFO buffer 158.

Main output controller 156 is coupled to main FIFO buffer 130 and may read audio samples from main FIFO buffer 130 and transmit them as a main audio stream 166 to summer 164. Main output controller 156 includes a fader 157 which may be used to attenuate the audio level (or amplitude) of an audio sample before it is transmitted as part of main audio stream 166.

Second output controller 162 is coupled to second FIFO buffer 158 and may read audio samples from second FIFO buffer 158 and transmit them as a second audio stream 168 to summer 164. Second output controller 162 includes an interpolator 160 which may be used to create an interpolated audio sample 176 by interpolation based on one or more real audio samples from second FIFO buffer 158. Second output controller 162 also includes a fader 163 which may be used to attenuate the audio level of an audio sample or an interpolated sample 170 before it is transmitted as part of second audio stream 168.

Summer 164 receives main audio stream 166 and second audio stream 168 and adds them together to produce an output audio stream 150 at audio output terminal 136.

Circuit 120 has two modes of operation. The first is a "steady-state" mode in which a single program signal (for example, program signal 140) is received as input stream 148 at terminal 122. The second mode is a "transition" mode that is initiated when a disruption is detected in the content of input stream 148 by disruption detector 124.

Figure 3:
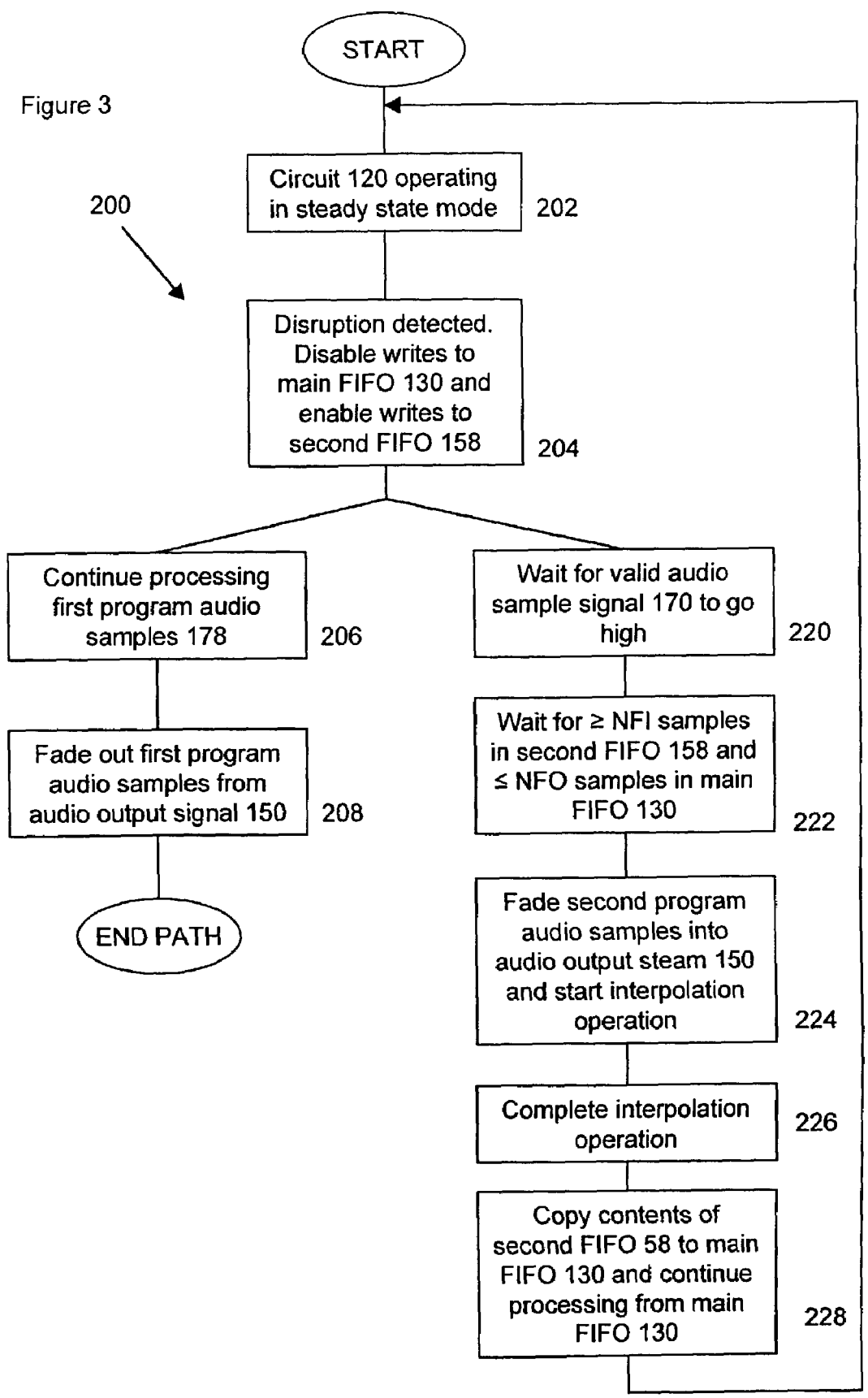
FIG. 3 is a flowchart illustrating the operation of the circuit of FIG. 2.
Figure 4:
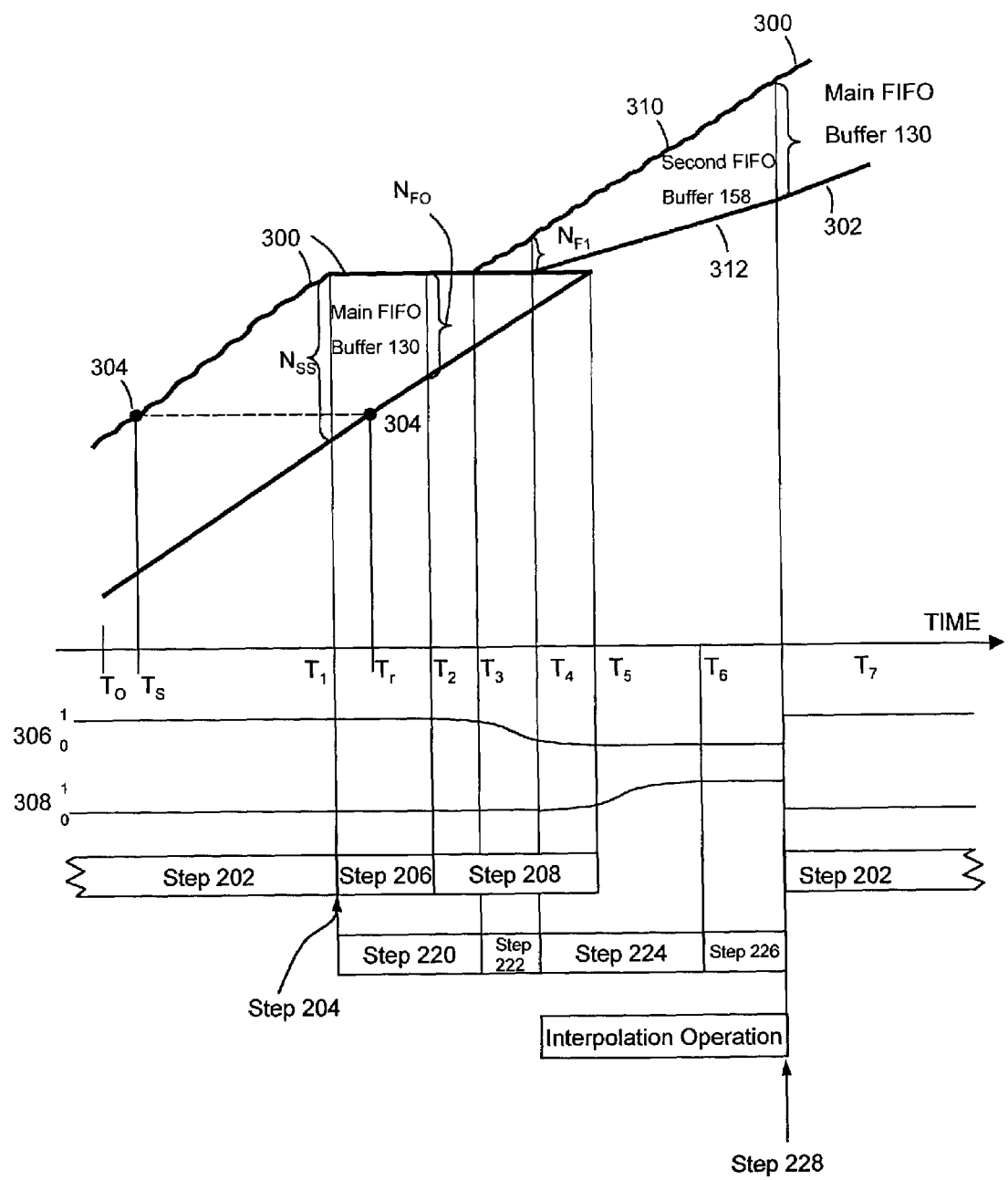
FIGS. 4 to 7 are timing diagrams illustrating the operation of the circuit of FIG. 2 under different timing conditions.

The two modes of operation will be explained with reference to FIGS. 3 and 4. FIG. 3 is a flowchart illustrating a method 200 of operation for circuit 120. FIG. 4 is a timing diagram corresponding to the operation illustrated in FIG. 3.

FIG. 4 has two sections. The upper section (above the time axis) illustrates the usage of the memory spaces of main FIFO buffer 130 and second FIFO buffer 158. Successive write operations are indicated by a progressively higher level in this section. In FIG. 4, the memory space of main FIFO buffer 130 and second FIFO buffer 158 are illustrated as if they have infinite size. In actual fact, main FIFO buffer 130 and second FIFO buffer 158 have a memory capacity capable of storing $N_{CAP}$ audio samples. It is not necessary that main FIFO buffer 130 and second FIFO buffer 158 have the same capacity, although it is preferable since they are used for an analogous purpose. A person skilled in the art will recognize that a real FIFO buffer normally makes a circular use of its memory space by returning its read and write pointers to the beginning of its memory space after reaching the end of the memory space.

The lower section of FIG. 4 (below the time axis) indicates the audio level of main audio stream 166 and of the second audio stream 168 as well as the timing of several steps of method 200.

Method 200 begins in step 202. At the beginning of step 202, in which circuit 120 is operating in its steady state mode. At the beginning of step 202, router 146 is coupling first program signal 140 from program source 138 to input terminal 122.

Throughout method 200, input stream 148 is received by disruption detector 124, which operates in a manner analogous to disruption detector 24 to determine if a transition in the content of input stream 148 has occurred. At the beginning of step 202, disruption detector 124 has not detected a transition in the content of input stream 148 and circuit 120 is operating in the steady state mode as follows.

Referring to FIG. 2, audio de-embedder 127 is receiving input stream 148 and providing video stream 129 at video output terminal 137 as well as audio stream 131. De-embedder sets valid audio sample signal 170 high.

Transition controller 126 sets main FIFO buffer write enable signal 172 high. In response to this and the high valid audio sample signal 170, each audio sample in audio stream 131 is stored into main FIFO buffer 130. Since these audio samples originate from first program signal 140, they will be referred to as first program audio samples 178 (FIG. 2).

Output controller 156 is synchronously reading the first program audio samples from main audio FIFO buffer 130 and transmitting them as main audio stream 166 to summer 164. Fader 157 is inoperative and the first program audio samples are transmitted to summer 164 with no change to their audio level.

Transition controller 126 sets second FIFO buffer write enable signal low and accordingly, second FIFO buffer 158 and output controller 162 are inactive. Second audio stream 168 has a zero output During step 202, summer 164 receives only the main audio stream 166 and therefore audio output stream 150 is identical to main audio stream 166.

Referring to FIG. 4, step 202 corresponds to the time period between $T_0$ and $T_1$. Line 300 indicates the address in the memory space of main FIFO buffer 130 to which first program audio samples 178 are being stored at any point in time. Line 302 indicates the address in the memory space of main FIFO buffer 130 from which first program audio samples 178 are read at any point in time. For example, a particular first program audio sample 304 is recorded in main FIFO buffer 130 at time $T_s$. The first program audio sample 304 is subsequently read from main FIFO buffer 130 at time $T_r$ by output controller 156 and transmitted as part of main audio stream 166.

The number of first program audio samples 178 stored in main FIFO buffer 130 will vary due to the bursty nature of audio signal 131 (which results in the wavy nature of line 300). The number of first program audio samples 178 stored in main FIFO buffer 130 at any particular time is indicated by the time difference (i.e. the horizontal difference) between line 300 and line 302. On average, the number of first program audio samples 178 stored in main FIFO buffer 130 is approximately equal to a selected number $N_{SS}$. On average, the number of first program audio samples 178 added to main FIFO buffer 130 and the number of first program audio samples 178 read from it during a period will be approximately equal. Typically $N_{SS}$ will be approximately 50% of $N_{CAP}$. If first program audio samples 178 are embedded in first program signal 140 in a particularly bursty way, then it is possible for the number of first program audio samples 178 to temporarily fill main FIFO buffer 130 (in which case some additional first program audio samples 178 may be lost) or for main FIFO buffer 130 to become empty, in which case there may be a space in main audio stream 166. Preferably, $N_{CAP}$ and $N_{SS}$ are chosen so these extreme events are extremely unlikely.

Line 306 in FIG. 4 indicates the attenuation of the main audio stream 166 by fader 157. During step 202, the amplification is equal to one and the audio level of the main audio stream is equal to the audio level of audio input stream 131 (i.e. it is not attenuated).

Step 202 ends when disruption detector 124 detects a transition in the content of input stream 148 at time $T_1$. Typically, the transition will be the result of router 146 switching from first program source 138 to second program source 142 so that input stream 148 switches from first program signal 140 to second program signal 144. Method 200 then proceeds to step 204.

In step 204, disruption detector 124 sets disruption signal 152 indicating the transition to transition controller 126. In response to the disruption signal 152, transition controller 126 stops the recordal of audio samples in main FIFO buffer 130 by making main buffer write enable signal 172 low. At the same time, transition controller 126 configures second FIFO buffer 158 to record audio samples from audio input stream 131 by making the second buffer write enable signal 174 high.

Referring to FIG. 4, step 204 takes place at time $T_1$.

Following step 204, disruption detector 124 continues to monitor input stream 148. When disruption detector 124 determines the input stream 148 is stable, it will reset disruption signal 152 to be low. This will occur before method 200 returns to step 202 (as described below in relation to step 228).

After step 204, method 200 proceeds down two parallel paths, which are carried out simultaneously. The Old Signal Path, which completes the processing of data from first program signal 140, begins in step 206 and is carried out until it is completed. Simultaneously, the New Signal Path, which starts the processing of data from second program signal 144, begins in step 220.

Old Signal Path

Reference is made to FIG. 2. In step 206, output controller 156 continues to read first program audio samples 178 from main FIFO buffer 130 and to transmit them as part of the main audio stream 166 without attenuating their audio level. Step 206 ends when the number of audio samples in main FIFO buffer falls to a fade-out threshold $N_{FO}$. In FIG. 4, this is indicated as time $T_2$.

Step 206 corresponds to the time period between time $T_1$ and time $T_2$ in FIG. 4. During step 206, line 300 (FIG. 4) does not advance in the memory space of main FIFO buffer 130 since transition controller 126 disabled the storage of additional audio samples in main FIFO buffer main FIFO buffer 130 at time $T_1$. However, line 302 continues to advance as previously stored first program audio samples 178 are read and transmitted by output controller 156.

The Old Signal Path of method 200 continues in step 208, in which the remaining first program audio samples 178 in main FIFO buffer 130 are read by main output controller 156 and transmitted to summer 164. However, prior to transmitting each successive first program audio sample 178, main output controller 156 engages fader 157 to progressively reduce the audio level of the sample, so that main audio stream 166 is progressively faded out during step 208.

In the preferred embodiment of the present invention, the remaining first program audio samples are faded according to a raised cosine template. Alternatively, any other fading technique rule or template may be used.

As an example of one alternate fading template, the remaining first program audio samples may be faded out linearly. For example, if $N_{FO}$ is 32 (i.e. step 208 is commenced when there are 32 audio samples remaining in main FIFO buffer 130), and if the first program audio samples 178 transmitted by signal source 138 are encoded using a digital audio standard that allows a 512 audio levels (i.e. 512 volume levels), then the first of the 32 remaining first program audio samples 178 in main FIFO buffer 130 is transmitted at its full audio level; the second of the remaining first program audio samples 178 is transmitted at 496/512 of its original audio level, etc. (The actual amplitude of each transmitted first program audio sample will depend on its actual encoded amplitude. For example, if a particular remaining first program audio sample is encoded with an amplitude of 375, and that sample is to have its audio level reduced to 224/512 of its original level (i.e. the 19$^{th}$ of the remaining first program audio samples), the particular remaining first program audio sample will be transmitted with an encoded amplitude of 164.) This process is continued until the last of the remaining first program audio samples 178 is transmitted at 16/512 of its original audio level. After the last remaining first program audio sample 178 is transmitted, main audio stream 166 has a value of zero. In this way, main audio stream 166 is faded out, and all of the first program audio samples 178 received by circuit 120 from signal source 138 are used by circuit 120.

The actual amplitude of the successive audio samples in the main audio stream 166 may not decrease according to the selected fading template, since the actual encoded amplitude of successive first program audio samples 178 may vary between the minimum and maximum levels of the digital audio protocol. If the encoded amplitude in successive first program audio samples is rising or falling (or alternately rising and falling) during the fade out process, the actual amplitude of the successive audio samples in the main stream will not decrease precisely according to the selected template, but by the end of the fade out process, main audio stream is fully faded out.

The fade-out threshold $N_{FO}$ is selected to allow the main audio stream to be faded out smoothly over a short time. The fade-out threshold $N_{FO}$ is preferably about half of $N_{SS}$, the number of samples preferably recorded in main buffer 130 when circuit 120 is operating in steady state, so that when a disruption is detected, the likelihood that main FIFO buffer 130 contains sufficient first program audio samples 178 to allow main audio stream 166 to be faded out smoothly is increased.

When all of the first program audio samples 178 have been read from main FIFO buffer 130, the Old Signal path of method 200 ends.

While first program signal 140 from program source 138 is processed by the Old Program Path of method 200 and is smoothly faded out of output audio stream 150, second program signal 144 from program source 142 is processed using the New Signal Path described below and is smoothly faded into output audio stream 150.

New Signal Path

Reference is again made to FIG. 3. The New Signal Path of method 200 begins in step 220. In this step, second FIFO buffer 158 monitors the valid audio sample signal 170 from de-embedder 127. After the content of input stream 148 has been switched from program signal 140 to 144 by router 146, de-embedder 127 may be momentarily out of synchronization with program signal 144, and may therefore be unable to de-embed any second program audio samples. Even when de-embedder 127 is synchronized with program signal 144, some initial audio samples in input stream 148 may be invalid due to communication errors, etc. During this period, de-embedder 127 will keep the valid audio sample signal 170 low to indicate that it is not transmitting valid audio samples. When de-embedder 127 is able to de-embed valid audio samples, it will make valid audio sample signal 170 high to indicate this. Typically, once de-embedder 127 is able to de-embed a few consecutive audio samples, it will be able to do so continuously. However, if de-embedder 127 is unable to de-embed valid audio samples from input stream 148 at any time, it will make valid audio sample signal 170 low for that time.

Since audio samples de-embedded from input stream 148 are now from second program signal 144, they are referred to as second program audio samples 180.

Step 220 ends when de-embedder 127 makes valid audio sample signal 170 high. FIG. 4, step 220 occurs during in the time period between $T_1$ and $T_3$.

Reference is made again to FIG. 2. As noted above in relation to step 204, disruption controller 124 will lower disruption signal 152 when it determines that input stream is stable. This will typically occur in conjunction with step 220 or earlier. Since de-embedder 127 is able to de-embed valid second program audio samples 180 by the end of this step, disruption controller 124 will generally also consider input stream 148 to be valid.

Referring to FIG. 3. The New Signal Path of method 200 then proceeds to step 222, in which valid second program audio samples 180 are successively recorded in second FIFO buffer 158. Step 222 ends when (i) the number of second program audio samples in second FIFO buffer 158 is equal to a selected threshold $N_{FI}$ and (ii) the number of first program audio samples 178 has fallen to fade-out threshold $N_{FO}$ (i.e. step 208 can begin).

In FIG. 4, line 310 indicates the storage of second program audio samples 180 in second FIFO buffer 158. Line 312 indicates the reading of second program audio samples 180 from second FIFO buffer 158, as explained in steps 224 and 226. Step 222 occurs during the time period between time $T_3$ and $T_4$.

The New Signal Path of method 200 next proceeds to step 224, in which output controller 162 begins to read second program audio samples 180 from second FIFO buffer 158 and transmit them as second audio stream 168 to summer 164. Output controller 162 uses fader 163 to fade in second audio stream 168 into output stream 150, preferably using a fade-in template complementary to the fade-out template used by output controller 156 in step 208 (e.g. if a raised cosine template is used in step 208, then a complementary raised cosine template is preferably used in this step).

The actual amplitude of successive audio samples in the second audio stream 168 may not rise precisely according to the selected fade-in template, depending on the actual encoded amplitude of the corresponding second program audio samples 180.

Referring to FIG. 4, step 224 corresponds to the time period between $T_4$ and $T_6$. During this period, line 312 begins to move through the memory space of second FIFO buffer 158 as output controller 162 begins to read second program audio samples from second FIFO buffer 158. Line 308 indicates the fade-in of second audio stream 168 (using a raised cosine template as an example).

Threshold $N_{FI}$ is selected so that second FIFO buffer 158 will contain sufficient second program audio samples 180 that it is unlikely to become empty as the second program audio samples 180 are read from second FIFO buffer 158 by output controller 162. Threshold $N_{FI}$ is preferably kept small to avoid a long time lag before second program audio samples 180 are transmitted as part of output audio stream 50. As a result, threshold $N_{FI}$ will typically be smaller than the number of samples $N_{SS}$ that is preferably stored in main FIFO buffer 130 during steady state operation. Since the number of second program audio samples 180 stored into second FIFO buffer 158 from de-embedder 127 will, on average, be equal to the number of second program audio samples 180 read out by output controller 162, the number of second program audio samples 180 will remain approximately constant and is unlikely to reach $N_{SS}$. To resolve this problem, circuit 120 implements a sample interpolation technique.

During step 224, output controller 162 reads second program audio samples 180 from second FIFO buffer 158 semi-synchronously. In order to allow the number of samples stored in second FIFO buffer 158 to build up to the desired number $N_{SS}$, output controller 162 periodically activates interpolator 160 to create an interpolated audio sample 176 based one or more real second program audio samples 180. Controller 162 then inserts the interpolated sample 176 into second audio stream 168. Since second audio stream 168 is a synchronous stream, controller 162 does not read a second program audio sample from second FIFO buffer 158 during the corresponding period. This allows the number of samples in second FIFO buffer 158 to build up from $N_{FI}$.

During step 224, interpolated samples 176 are faded in to second audio stream 168 as if they were actual samples read from second FIFO buffer 158.

Step 224 ends when the second audio stream 168 has been faded in and is being transmitted at its full audio level as output audio stream 150. Preferably, the fade-in operation in step 224 is exactly complementary to the fade-out operation of step 208, so that the number of audio samples (including second program audio samples 180 and interpolated samples 176, as described below) used to fade in second audio stream 168 is equal to the number of fade out samples $N_{FO}$.

Referring to FIG. 4, step 224 occurs between time $T_4$ and time $T_6$.

The New Signal Path of method 200 next proceeds to step 226, in which the interpolation operation of step 224 is continued. Preferably, the interpolation operation is carried over a longer time period than the fade-in operation. Preferably, the fade-in operation is performed relatively quickly (at the same rate as the fade out of main audio stream 166 in step 208) so that second audio stream 168 reaches its full audio level without an unnecessary time lag. However, performing the interpolation operation too quickly may result in a noticeable distortion of second audio stream 168. As a result, the interpolation operation continues after the fade-in operation is complete.

The interpolation operation may be performed using any known interpolation technique. In the preferred embodiment, a two-tap interpolation technique is used to create one interpolated sample 176 for every seven second program audio samples 180. After seven second program audio samples 180 have been transmitted as part of second audio stream 168, the seventh and eighth second program audio samples 180 are averaged to produce an interpolated sample 178. This interpolated sample 178 is then transmitted in the second audio stream 168. The eighth second audio program sample 180 is then transmitted and the process is repeated every seven samples.

The interpolation operation ends when the number of second program audio samples 180 in second FIFO buffer 158 is equal to $N_{SS}$. Referring to FIG. 4, step 226 occurs between time $T_6$ and time $T_7$. The interpolation operation occurs between time $T_4$ and $T_7$.

The New Signal Path of method 200 then moves to step 228, in which the contents of second FIFO buffer 158 are copied into main FIFO buffer 130 and transition controller 126 sets main buffer write enable signal 172 to be high and resets second buffer write enable signal 174 to be low. The copying operation may be performed by transition controller 126 using additional data and control lines (not shown).

At the same time, main output controller 156 begins to read audio samples from main FIFO buffer 130 and transmitting them to summer 164 at their full audio level.

Step 228 provides a seamless transfer of the processing for second program signal 144 from second FIFO buffer 158 and second output controller 162 to main FIFO buffer 130 and main output controller 156.

Step 228 configures circuit 120 has the effect that main FIFO buffer 130 and main output controller 156 are to continue the processing of the second program signal 144. This is done so that second FIFO buffer 158 and output controller 162 are available when another transition from the second program signal 144 to a third program signal (not shown), which may in fact be the first program signal, occurs. In the preferred embodiment, this step is necessary because main output controller 156 does not include an interpolator. If main output controller 156 did include an interpolator, then step 228 would not be necessary and the next transition (to a third program signal) could be processed by using main FIFO buffer 130 and main output controller 156 for the third signal.

Referring to FIG. 4, step 228 occurs at time $T_7$. After step 228, circuit 120 has returned to its initial condition before step 220. Time $T_7$ may therefore be seen as the same point as time $T_0$. After step 228, method 200 returns to step 202.

Figure 5:
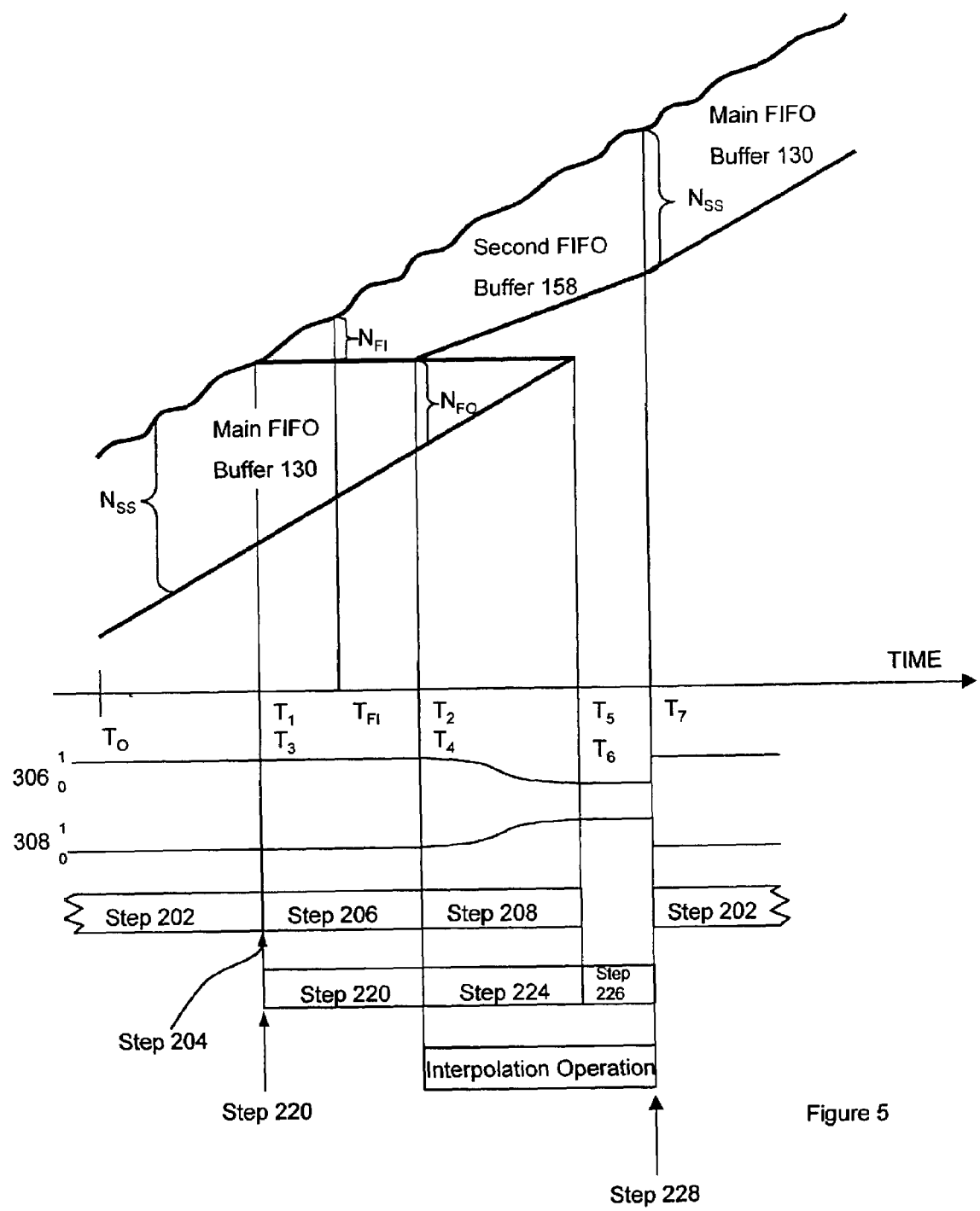
Figure 6:
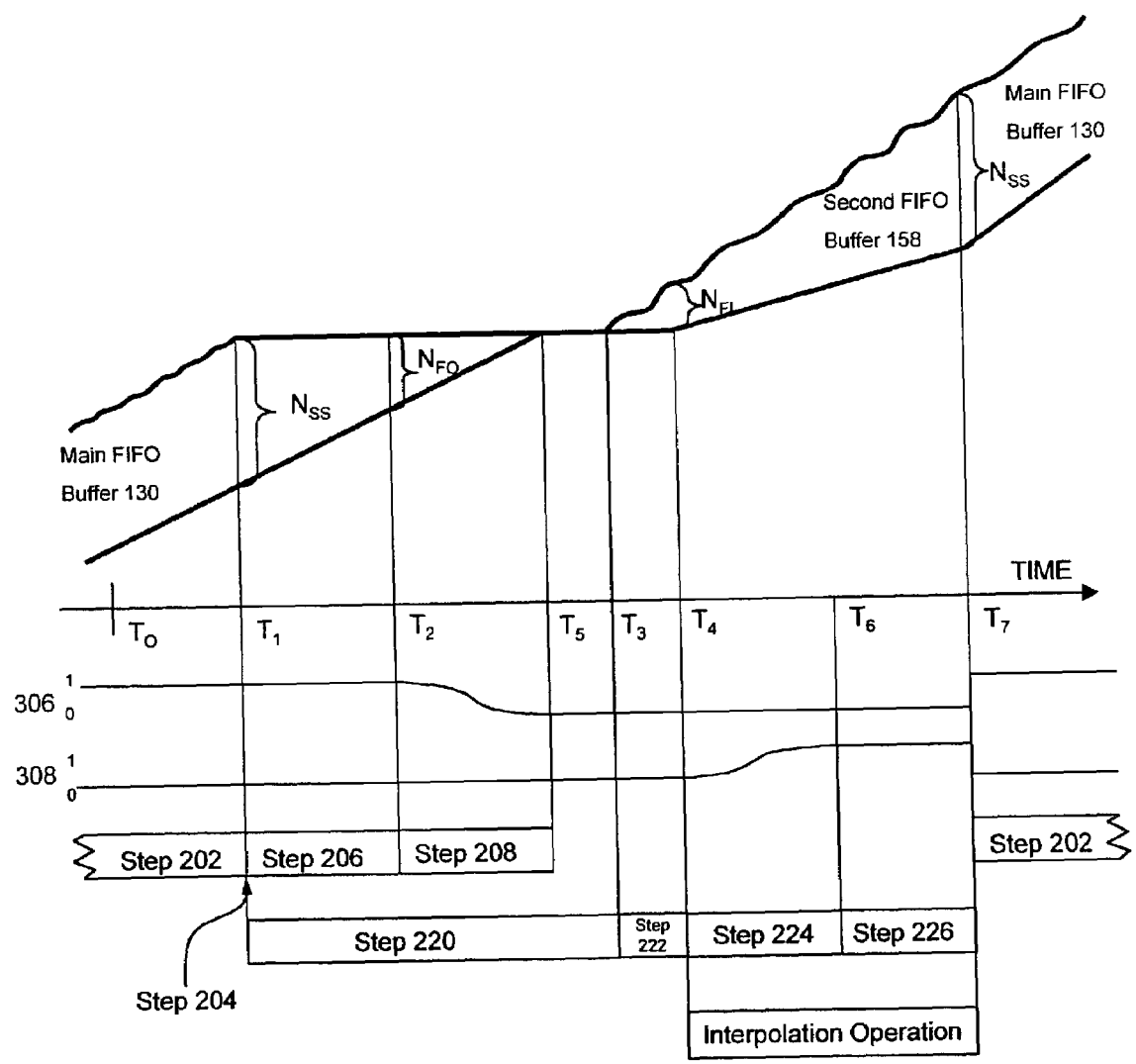
Figure 7:
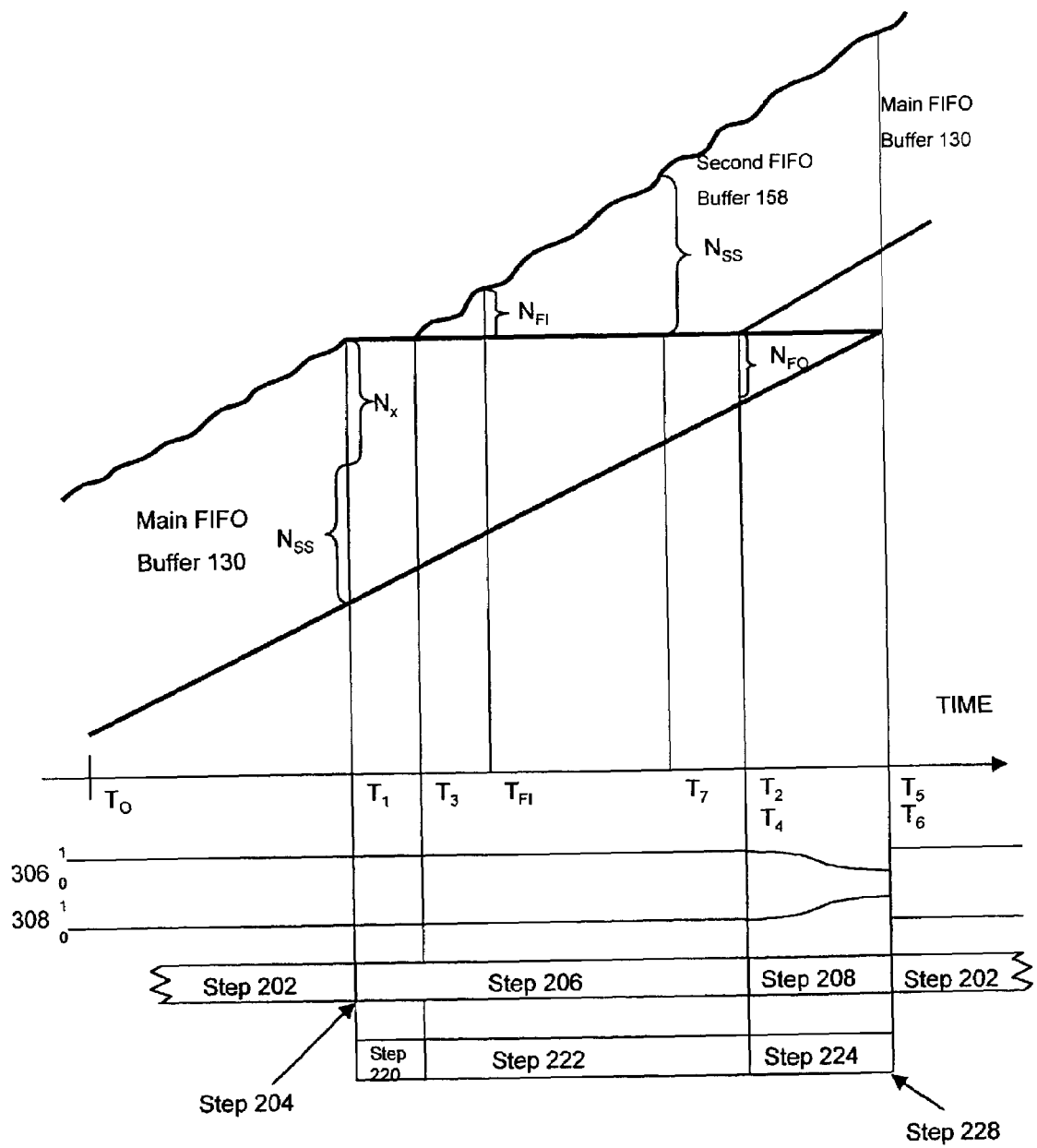

FIG. 4 illustrates the operation of circuit 120 in a typical situation where the instability in the content of input stream 148 lasts for a short time (between time $T_1$ and time $T_3$). FIG. 5 to 7 illustrate other cases where this instability is longer or shorter.

Reference is next made to FIG. 5, which illustrates the case where there is no instability in input stream 148 when a transition occurs. In this case, de-embedder 127 will be able to valid de-embed second program audio samples 180 immediately after the transition (at time $T_1$), with the result that time $T_3$ occurs at the same time as time $T_1$. Step 220 may then be skipped (since there is no need to wait for valid second program audio samples 180.) Step 222 may then begin immediately at time $T_1$. Step 224, during which second audio stream 168 is faded in is delayed until time $T_4$, even though second FIFO buffer 158 contains more than $N_{FI}$ samples at time $T_{FI}$. This is done because main FIFO buffer 130 still has more than $N_{FO}$ first program audio samples 178 in it until time $T_4$.

Beginning at time $T_4$, main audio stream 166 is faded out in step 208 and, simultaneously, second audio stream 168 is faded in by step 224. FIG. 5 demonstrates the ideal case for using circuit 120. As a result of the simultaneous fade-in and fade-out operations, the total audio level of output audio stream 150 remains constant. In contrast, in FIG. 4, the total audio level of output audio stream 150 is attenuated between time $T_2$ and time $T_6$.

In the case of FIG. 5, more than $N_{FI}$ second program audio sample 180 are stored in second FIFO buffer 158 prior to step 224. As a result, the interpolation operation that take place during steps 224 and 226 is completed faster, since fewer additional second program audio samples 180 are required to build second FIFO buffer 158 up to $N_{SS}$ second program audio samples 180.

Reference is next made to FIG. 6, which illustrates the case of long periods of instability in input stream 148 after a transition. Main audio stream 166 is faded out as described above during step 208. However, at the completion of step 208, time $T_3$ (valid second program audio samples 180 are available from de-embedder 127) has not occurred. Valid second program audio samples 180 are not available until time $T_3$ and the processing of fading in second audio stream 168 does not begin until time $T_4$. As a result, audio output stream 150 actually has an attenuated audio level between time $T_2$ and time $T_6$ and an audio level of zero between time $T_5$ and time $T_4$.

Reference is next made to FIG. 7, which illustrate a case in which the interpolation operation of steps 224 and 226 is not required. At time $T_1$, main FIFO buffer 130 has substantially more than $N_{SS}$ samples in it. As noted above, this can occur due to the bursty way in audio samples are typically embedded in a digital video signal. Step 206 commences at time $T_1$ and ends at time $T_2$ when main FIFO buffer 130 has $N_{FF}$ audio samples in it. A short period of instability occurs on input stream 148 between time $T_1$ and time $T_3$ (step 220). At time $T_{FI}$ second FIFO buffer 158 has $N_{FI}$ audio samples in it. However, step 222 does not begin until time $T_4$. As in the case of FIG. 5, time $T_4$ coincides with time $T_2$. Between time $T_{FI}$ and time $T_4$, time $T_7$ occurs when $N_{SS}$ second program audio samples 180 are stored in second FIFO buffer 158. As a result, when time $T_4$ occurs, second FIFO buffer 158 already has sufficient second program audio samples 180 in it that an interpolation operation is not required to build up the number of second program audio samples 180 in second FIFO buffer 158 to $N_{SS}$. Accordingly, no interpolation operation is performed in step 224 and step 226 is skipped entirely. This will occur when ever time $T_7$ occurs before time $T_4$.

Circuit 120 overcomes the disadvantages of prior art circuit 20. By providing a smooth fade-out of the first program signal 140 and a smooth fade in of the second program signal 144, circuit 120 makes use of all available audio data from both audio programs. Except in the case of a long period of instability in input stream 148, the audio level of audio output stream 150 is not reduced to zero. In the ideal case, where there is no instability in input stream 148 after a transition, there is no attenuation of the audio level of audio output stream 150 at all. In a case where a long period of instability occurs in input stream 148, the audio output stream is smoothly attenuated to a zero level and then smoothly faded in when audio data is available.

Circuit 120 has been described with a structure suitable for use in the input stage of a digital television receiver, set-top cable box or other such device. The video and audio components of the input stream 148 are separated and provided separately as video output stream 29 and audio output stream 50. Circuit 120 is equally suitable for use as a pre-filter for a separate device. In this case, video output stream 29 and audio output 50 may be combined using an embedder (not shown) to produce a digital video signal with embedded audio which contains a smooth transition between first program signal 140 and second program signal 144 and which contain continuous synchronization and validity checking data. Furthermore, circuit 120 is suitable for use with two digital audio data streams. In such a system, the input stream 148 would consist only of a stream of audio samples from two digital audio sources. Embedder 127 would be required to generate valid audio sample signal 170. In another alternative embodiment, input stream 148 may consist of a mix of digital audio and digital video samples containing embedded audio samples. In such a case, embedder 127 would pass through valid digital audio samples and would extract valid audio samples from digital video samples, as required.

Main FIFO buffer 130 and second FIFO buffer 158 have been described as two distinct elements. In an alternative embodiment of the present invention, the two FIFO buffer may be combined into a single memory device, which may have multiple input and output ports. Preferably, such a memory device will have a memory capacity of $2 \times N_{CAP}$ audio samples.

One exemplary implementation of the preferred embodiment has the following characteristics: the input stream in a 27 MHz/10 bit digital video signal with embedded digital audio sampled at 48.0 kHz. Main FIFO buffer 130 and second FIFO buffer 158 each have a capacity $N_{CAP}$ of 128 audio samples. The preferred steady state operating level $N_{SS}$ is 64 audio samples. The fade-out threshold $N_{FO}$ is 32 audio samples and the fade-in threshold $N_{FI}$ is 16 samples.

Circuit 120 has been described with two FIFO buffers: main FIFO buffer 130 and second FIFO buffer 158. In fact, any type of memory devices may be used in place of these FIFO buffers, as long is the memory devices allow audio samples to be stored and sequentially read out.

An exemplary embodiment of the present invention has been described. A person skilled in the art will be capable of developing many modifications and variations of the described embodiment within the spirit and scope of the invention, which is limited only by the appended claims.

We claim:

1. A method of providing an audio output stream in response to a digital video input stream containing embedded audio samples, the method comprising:
    (a) receiving a first program in the input stream wherein the first program includes a series of first program audio samples;
    (b) storing the first program audio samples in a main audio data buffer;
    (c) reading the first program audio samples from the main audio data buffer and transmitting them as part of the audio output stream;
    (d) detecting a transition in the input stream wherein said transition indicates the beginning of a second program, and wherein the second program includes a series of second program audio samples;
    (e) receiving the second program audio samples;
    (f) storing the second program audio samples in a second audio data buffer;
    (g) when the number of first program audio samples in the main audio data buffer reaches a fade-out threshold, transmitting each of the remaining first audio program samples in the audio output stream at progressively lower audio levels; and
    (h) when the number of second program audio samples in the second audio data buffer reaches a fade-in threshold, reading a set of fade-in samples from the second audio buffer and transmitting the fade-in samples as part of the audio output stream at progressively higher audio levels.

2. The method of claim 1 wherein step (g) begins prior to or concurrently with the start of step (h).

3. The method of claim 1 wherein the fade-out threshold equals the number of fade-in samples.

4. The method of claim 1 wherein in step (c), the first program audio samples are transmitted without attenuation of their audio level and wherein, in step (g), each of the remaining first audio program samples is transmitted with an attenuated audio level.

5. The method of claim 4 wherein the last remaining first audio program sample is transmitted with an audio level of approximately zero.

6. The method of claim 1 wherein the audio level of the remaining first audio program samples is reduced according to a selected fade-out formula, rule or template.

7. The method of claim 6 wherein the audio level of the audio levels of the fade-in samples is increased according to a fade-in formula, rule or template complementary to the fade-out formula, rule or template.

8. The method of claim 4 wherein the audio level of the remaining first audio program samples is reduced according to a raised cosine template.

9. The method of claim 8 wherein the last remaining first audio program sample is transmitted with an audio level of about zero.

10. The method of claim 4 wherein the audio level of the remaining first audio program samples is reduced linearly.

11. The method of claim 9 wherein the last remaining first audio program sample is transmitted with an audio level of approximately zero.

12. The method of claim 4 wherein, in step (h), the first fade-in sample is transmitted at an audio level of about zero.

13. The method of claim 12 wherein the last fade-in sample is transmitted without attenuation of its audio level.

14. The method of claim 12 wherein each of the remaining first audio program samples is transmitted concurrently with one of the fade-in samples.

15. The method of claim 14 wherein the total audio level of the digital audio output stream remains approximately constant.

16. The method of claim 5 wherein steps (g) and (h) begin at the same time and are performed concurrently.

17. The method of claim 16 wherein each of the remaining first audio program samples is transmitted concurrently with one of the fade-in samples.

18. The method of claim 17 wherein the total audio level of the digital audio output stream remains approximately constant.

19. The method of claim 1 including the following step:
(i) during an interpolation period, periodically inserting an interpolated sample into the audio output stream, wherein the second audio data buffer is a FIFO buffer and whereby the insertion of interpolated samples in the digital audio output stream allows the number of second program audio samples stored in the second audio data buffer to increase.

20. The method of claim 19 wherein the audio output stream is a synchronous stream.

21. The method of claim 19 or 20 wherein step (i) begins at the same time as step (g).

22. The method of claim 21 wherein step (i) is terminated when the number of second program audio samples stored reaches a selected steady-state level.

23. A method of providing an audio output stream in response to an input stream containing a stream of first program audio samples followed by a stream of second program audio samples, the method comprising:
(a) receiving the stream of first program audio samples and sequentially storing the first program audio samples in a main audio data buffer;
(b) reading the first program audio samples from the main audio data buffer and transmitting them as part of the audio output stream;
(c) detecting a transition in the input stream from the stream of first program input samples to the stream of second program audio samples;
(d) receiving the stream of second program audio samples and sequentially storing the second program audio samples in a second audio data buffer;
(e) when the number of first program audio samples in the main audio data buffer reaches a fade-out threshold, transmitting each of the remaining first audio program samples in the audio output stream at progressively lower audio levels; and
(f) when the number of second program audio samples in the second audio data buffer reaches a fade-in threshold, sequentially reading a set of fade-in samples from the second audio buffer and transmitting the fade-in samples as part of the audio output stream at progressively higher audio levels.

24. The method of claim 23 including the following step:
(g) during an interpolation period, periodically inserting an interpolated sample into the audio output stream, wherein the second audio data buffer is a FIFO buffer and whereby the insertion of interpolated samples in the digital audio output stream allows the number of second program audio samples stored in the second audio data buffer to increase.

25. The method of claim 24 wherein the beginning or step (g) corresponds to the beginning of step (f).

26. The method of claim 25 wherein step (g) is terminated when the number of second program audio samples stored reaches a selected steady-state level.

27. The method of claim 23 wherein step (e) begins prior to or concurrently with the start of step (f).

28. The method of claim 23 wherein the audio level of the remaining first audio program samples is reduced according to a selected fade-out formula, rule or template.

29. The method of claim 28 wherein the audio level of the audio levels of the fade-in samples is increased according to a fade-in formula, rule or template complementary to the fade-out formula, rule or template.

30. The method of claim 29 wherein the audio level of the remaining first audio program samples is reduced according to a raised cosine template.

31. The method of claim 29 wherein the audio level of the remaining first audio program samples is reduced linearly.

32. The method of claim 23 wherein, in step (f) the last fade-in sample is transmitted without attenuation of its audio level.

33. The method of claim 27 wherein steps (f) and (g) begin at the same time and are performed concurrently.

34. The method of claim 23 wherein each of the remaining first audio program samples is transmitted concurrently with one of the fade-in samples.

35. The method of claim 23 wherein steps (e) and (f) begin at the same time and are performed concurrently.

36. The method of claim 23 wherein the audio output stream is a synchronous stream.

37. The method of claim 23 wherein the fade-out threshold equals the number of fade-in samples.

38. A system for transmitting an audio output stream in response to an input stream containing a stream of first program audio samples followed by a stream of second program audio samples, the system comprising:
(a) an input terminal for receiving said input stream;
(b) a disruption detector coupled to said input terminal for detecting a transition in said input stream between said stream of first program audio samples and said stream of second program audio samples and for generating a disruption signal corresponding to said transition;
(c) a transition controller coupled to said disruption detector for generating a main buffer write enable signal and a second buffer write enable signal in response to said disruption signal;

(d) an audio de-embedder coupled to said input terminal for extracting said first and second program audio samples from input stream and for generating a valid audio sample signal for indicating when valid audio samples are being received;

(e) a main buffer coupled to said audio de-embedder for receiving and storing said stream of first program audio samples in response to said first buffer write enable signal while valid audio samples are being received;

(f) a second buffer coupled to said audio de-embedder for receiving and storing said stream of second program audio samples in response to said second buffer write enable signal while valid audio samples are being received;

(g) a main output controller coupled to said main buffer for reading said first program audio samples from said main buffer and for transmitting a main audio stream corresponding to said first program audio samples, wherein, when the number of said first program audio samples stored in said main buffer is at or below a selected fade-out threshold, said main output controller attenuates the audio level of each remaining first program audio sample in said main audio stream;

(h) a second output controller coupled to said second buffer for reading said second program audio samples from said second buffer and for transmitting a second audio stream corresponding to said second program audio samples, wherein, said second output controller is configured to attenuate the audio level of a selected number of fade-in second program audio samples in said second output stream, wherein said second output controller is configured to begin reading said second program audio samples after the number of said first program audio samples stored in said main buffer is at or below the selected fade-out threshold;

(i) a summer coupled to main output controller and to said second output controller for generating said audio output stream corresponding to said main output stream and said second output stream, wherein said transition controller configures said main buffer write enable signal and said second buffer write enable signal such that, prior to the detection of said transition, said main buffer is enabled and said second buffer is disabled and, after said transition, said main buffer is disabled and said second buffer is enabled.

39. The system of claim 38 wherein said main output controller is configured to progressively attenuate the audio level of each successive remaining first program audio sample.

40. The system of claim 39 wherein main output controller is configured to reduce the audio level of said main output stream to about zero according to a selected fade-out formula, rule or template.

41. The system of claim 40 wherein said second output controller is configured to progressively reduce the attenuation of the audio level of each said fade-in second program audio samples according to a fade-in formula, rule or template that is complementary to the selected fade-out formula, rule or template.

42. The system of claim 39 wherein said second output controller is configured to progressively reduce the attenuation of the audio level of each said fade-in second program audio samples.

43. The system of claim 38 wherein at least one of said first program audio samples or said second program audio samples are embedded within a stream of digital video data.

44. The system of claim 38 wherein said first program audio samples and said second program audio samples are embedded within a stream of digital video data.

45. The system of claim 38 wherein said second output controller includes an interpolator for periodically inserting an interpolated audio sample into said second output stream between two of said second program audio samples.

46. The system of claim 45 wherein said second output stream is synchronous and said insertion of said interpolated audio samples allows the number of second program audio samples stored in said second buffer to increase.

47. The system of 45 wherein said interpolator is configured to operate until the number of second program audio samples in said second buffer reaches a selected level.

48. The method of claim 5 wherein steps (g) and (h) begin at the same time and are performed concurrently.

* * * * *